United States Patent
Chen et al.

(10) Patent No.: US 9,864,529 B1
(45) Date of Patent: Jan. 9, 2018

(54) HOST COMPATIBILITY FOR HOST MANAGED STORAGE MEDIA

(71) Applicant: Western Digital Technologies, Inc., Irvine, CA (US)

(72) Inventors: Albert H. Chen, Redmond, WA (US); James N. Malina, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 346 days.

(21) Appl. No.: 14/606,921

(22) Filed: Jan. 27, 2015

Related U.S. Application Data

(60) Provisional application No. 61/932,134, filed on Jan. 27, 2014.

(51) Int. Cl.
G06F 3/06 (2006.01)

(52) U.S. Cl.
CPC .......... G06F 3/0619 (2013.01); G06F 3/0655 (2013.01); G06F 3/0676 (2013.01)

(58) Field of Classification Search
CPC ..... G06F 3/0619; G06F 3/0655; G06F 3/0676
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |

(Continued)

Primary Examiner — Reginald Bragdon
Assistant Examiner — Edward Wang
(74) Attorney, Agent, or Firm — Barry IP Law

(57) ABSTRACT

During a startup process of a host, a request is sent to a DSD to identify storage media of the DSD. Identification information is received from the DSD before executing a driver on the host for interfacing with the DSD. The identification information identifies a first storage media of the DSD in response to the request. A second storage media is later identified using the driver.

42 Claims, 7 Drawing Sheets

(56) References Cited

U.S. PATENT DOCUMENTS

| | | |
|---|---|---|
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |

(56) References Cited

U.S. PATENT DOCUMENTS

| | | |
|---|---|---|
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kepner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |

(56) References Cited

U.S. PATENT DOCUMENTS

| | | |
|---|---|---|
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,162 B1* | 4/2014 | Grobis ............... G11B 5/09 360/45 |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0059476 A1* | 5/2002 | Yamada ............. G06F 3/0601 710/1 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0099216 A1* | 4/2012 | Grobis ............... G11B 5/012 360/39 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0135767 A1 | 5/2013 | Hall et al. |
| 2014/0019680 A1 | 1/2014 | Jin et al. |
| 2014/0122774 A1* | 5/2014 | Xian ............... G06F 12/0246 711/103 |
| 2014/0136575 A1* | 5/2014 | Zhao ............ G06F 17/30303 707/813 |
| 2014/0201424 A1 | 7/2014 | Chen et al. |
| 2014/0310451 A1* | 10/2014 | Lee ................. G06F 3/0605 711/105 |

\* cited by examiner

HOST COMPATIBILITY FOR HOST MANAGED STORAGE MEDIA

CROSS-REFERENCE TO RELATED APPLICATION

This application claims the benefit of U.S. Provisional Application No. 61/932,134, filed on Jan. 27, 2014, which is hereby incorporated by reference in its entirety.

BACKGROUND

Data Storage Devices (DSDs) are often used to record data onto or to reproduce data from storage media. DSDs can include different types of storage media, such as solid-state memory (e.g., flash memory) or a rotating magnetic disk. For such storage media, the DSD may use a logical to physical mapping that maps logical addresses for data to physical addresses indicating where the data is stored on the storage media.

In the case of solid-state memory, the DSD may use an indirection system to facilitate the rewriting of data associated with a particular logical address at different physical locations on the storage media. Such an indirection system may, for example, provide for wear leveling so that the solid-state memory is more evenly used to prolong a usable life of the solid-state memory.

A disk storage media may also use an indirection system to facilitate the rewriting of data associated with a particular logical address at different physical locations on the storage media. Such an indirection system may, for example, provide for sequential writing on the disk so that tracks can be written in an overlapping pattern using Shingled Magnetic Recording (SMR) to increase the amount of data stored in a given area on the disk. In such SMR DSDs, data is generally written sequentially to avoid rewriting an overlapped track on the disk since such rewriting would also adversely affect data written in an adjacent track.

Managing sequentially written data or managing an indirection system for storage media typically requires additional processing by the DSD. Although performing such additional processing on the host side can theoretically be more efficient, proposed host side solutions often involve modifications to host software such as an Operating System (OS) that can adversely affect host software compatibility and reliability.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
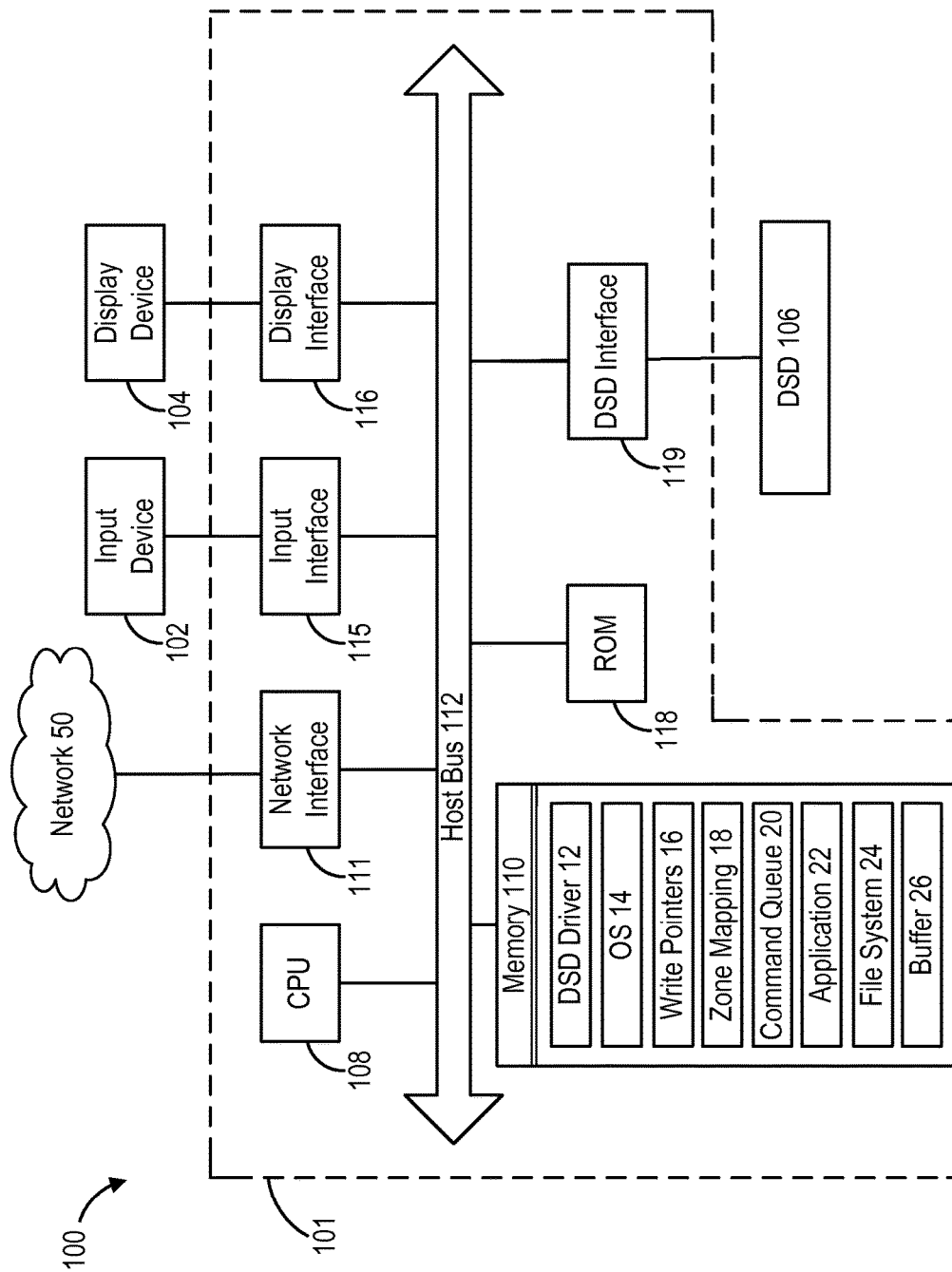
FIG. 1 is a block diagram depicting a system including a host and a Data Storage Device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network, such as network 50, which can, for example, be a local or wide area network, or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 108 interfaces with host bus 112. Also interfacing with host bus 112 are memory 110, input interface 115 for input device 102, display interface 116 for display device 104, Read Only Memory (ROM) 118, network interface 111, and DSD interface 119 for DSD 106. DSD interface 119 is configured to interface host 101 with DSD 106, and can interface according to a standard such as Serial Advanced Technology Attachment (SATA), PCI express (PCIe), Small Computer System Interface (SCSI), or Serial Attached SCSI (SAS).

Memory 110 can represent a volatile or Non-Volatile Memory (NVM) of host 101 that interfaces with host bus 112 to provide information stored in memory 110 to CPU 108 during execution of instructions in software programs such as DSD driver 12, Operating System (OS) 14, or application 22. More specifically, CPU 108 first loads computer-executable instructions from DSD 106 into a region of memory 110. CPU 108 can then execute the stored process instructions from memory 110. Data such as write pointers 16, zone mapping 18, command queue 20, or data to be stored in or retrieved from DSD 106 can also be stored in memory 110 so that the data can be accessed by CPU 108 during execution of software programs to the extent that such software programs have a need to access and/or modify the data.

DSD driver 12 provides a software interface for DSD 106 on host 101, and can cause CPU 108 to perform processes for managing storage media of DSD 106 as discussed below. OS 14 manages hardware and software resources of system 100 and can include, for example, a Linux OS, an Apple OS, or a Windows OS. During a startup process of host 101, OS 14 is loaded into memory 110 and executed by CPU 108.

As shown in the example of FIG. 1, memory 110 is also configured to store write pointers 16, zone mapping 18, command queue 20, file system 24, and buffer 26. As discussed in more detail below, one or more of these can be used by CPU 108 when executing DSD driver 12 to manage data stored in DSD 106. Memory 110 is also shown as storing application 22, which can include a program executed by CPU 108 that interacts with DSD driver 12 to provide information to DSD driver 12 in managing data stored in DSD 106.

If using address indirection, DSDs conventionally perform address indirection with little or no involvement from a host. However, with the increasing data capacities of DSDs, performing address indirection for storage media such as Shingled Magnetic Recording (SMR) storage media can consume a significant amount of memory and processing resources of the DSD. A host, such as host 101, typically has greater processing and memory resources than the DSD. As discussed below, shifting the performance of address indirection and other management tasks from the DSD to the host can improve an overall system performance. However, such a shift in managing the storage media from the DSD to the host can be incompatible with the way hosts usually boot up.

In more detail, a host will typically access data associated with certain fixed Logical Block Addresses (LBAs) stored in the DSD during a startup process of the host. If the host is responsible for performing address indirection, the host may not be able to properly startup if the fixed LBAs have been moved to a different physical location in the storage media and the host has not yet executed any applications needed for address indirection. Address indirection can interfere with keeping data used during the startup process (e.g., a Master Boot Record (MBR), OS boot loader files, or kernel files) at the same physical location since such data may have been previously relocated by the address indirection. In addition, modifying the data used during the startup process may involve moving the modified data to a new location or rewriting a large portion of the storage media to maintain sequential writing, as in the case of SMR storage media.

Figure 2:
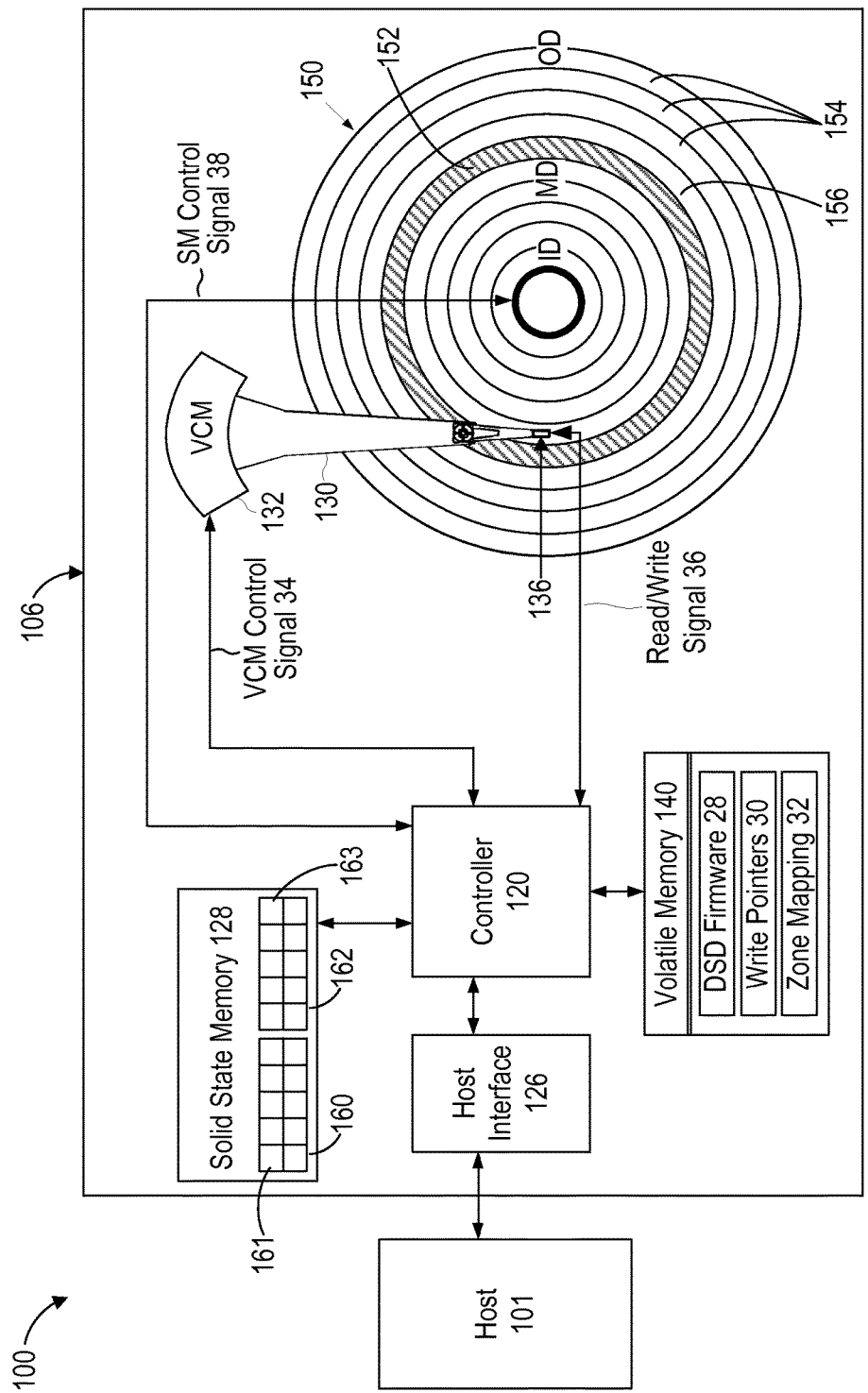
FIG. 2 is a block diagram depicting the DSD of FIG. 1 according to an embodiment.

The present disclosure therefore limits the identification of storage media during a startup process of host 101 to a first storage media (e.g., Conventional Magnetic Recording (CMR) zone 152 and Solid-State Media (SSM) zone 160 shown in FIG. 2) that is more compatible with having a fixed location for data used during a startup process of host 101. A second storage media of DSD 106 that is less compatible with the startup process (e.g., SSM zone 162 and SMR zones 154 and 156 shown in FIG. 2) are later identified using DSD driver 12, which can manage the second storage media when executed by CPU 108.

FIG. 2 depicts a block diagram of DSD 106 according to an embodiment where DSD 106 is a Hard Disk Drive (HDD) with NVM including rotating magnetic disks (i.e., disks in disk pack 150). Alternatively, DSD 106 could be a Solid-State Hybrid Drive (SSHD) including both disk NVM in the form of disk pack 150 and solid-state NVM in the form of solid-state memory 128. In other embodiments, each of disk pack 150 or solid-state memory 128 may be replaced by multiple HDDs or multiple Solid-State Drives (SSDs), respectively, so that DSD 106 includes pools of HDDs and/or SSDs. In addition, other embodiments may not include one of solid-state memory 128 or disk pack 150. In yet other embodiments, DSD 106 can include any other type of NVM such as a magnetic tape.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 2, DSD 106 includes controller 120 which comprises circuitry such as one or more processors for executing instructions and can include a microcontroller, a DSP, an ASIC, an FPGA, hard-wired logic, analog circuitry and/or a combination thereof. In one implementation, controller 120 can include a System on a Chip (SoC). In addition, an SSD controller may be utilized that operates in conjunction with controller 120 for controlling operation of solid-state memory 128.

Host interface 126 is configured to interface DSD 106 with host 101 and may interface according to a standard such as, for example, PCIe, SATA, SCSI, or SAS. As will be appreciated by those of ordinary skill in the art, host interface 126 can be included as part of controller 120. Although FIGS. 1 and 2 depict the co-location of host 101 and DSD 106, in other embodiments the two need not be physically co-located. In such embodiments, DSD 106 may be located remotely from host 101 and connected to host 101 via a network interface.

In the example embodiment of FIG. 2, solid-state memory 128 includes SSM zones 160 and 162 with cells 161 and 163, respectively. Although SSM zones 160 and 162 are shown as part of solid-state memory 128, SSM zones 160 and 162 can be located in separate components in other embodiments. In one implementation, DSD driver 12 may use address indirection in accessing data from SSM zone 162 to provide wear-leveling of cells 163 so that the usage of cells 163 is more evenly distributed. On the other hand, DSD driver 12 may not use address indirection in accessing data from SSM zone 160 so that cells 161 can be generally associated with certain fixed LBAs.

In the example of FIG. 2, disk pack 150 is rotated by a spindle motor (not shown). DSD 106 also includes Head Stack Assembly (HSA) 136 connected to the distal end of actuator 130 which is rotated by Voice Coil Motor (VCM) 132 to position HSA 136 in relation to disk pack 150. Controller 120 can include servo control circuitry (not shown) to control the position of HSA 136 and the rotation of disk pack 150 using VCM control signal 34 and SM control signal 38, respectively.

Disk pack 150 comprises multiple disks that are radially aligned so as to rotate about a spindle motor. Each disk in disk pack 150 includes a number of radially spaced, concentric tracks (not shown) for storing data. HSA 136 includes multiple heads each arranged to read data from and write data to a corresponding surface of a disk in disk pack 150.

As shown in FIG. 2, disk pack 150 includes zones of tracks such as zones 152, 154, and 156. Zone 152 can include a zone of non-overlapping tracks (i.e., a CMR zone) that can be referred to as part of a first storage media that generally allows for rewriting data associated with a particular LBA in the same physical location (i.e., write-in-place). The example embodiment of FIG. 2 depicts zone 152 of the first storage media in a Middle Diameter (MD) portion of disk pack 150. In this regard, zone 152 with a lower track density may be located in an MD portion since locating a higher track density region in other portions of disk pack 150, such as an Outer Diameter (OD) or Inner Diameter (ID) portion, can result in an increased data capacity than locating the higher track density region in an MD portion. In other embodiments, the first storage media of zone 152 may be located in other portions of disk pack 150. In addition, the first storage media may include additional CMR zones on other disk surfaces of disk pack 150 and/or SSM zone 160 in solid-state memory 128.

Zones 154 and 156 can include overlapping tracks (i.e., SMR zones) that can be referred to as part of a second storage media that does not generally allow for rewriting data associated with a particular LBA in the same physical location. As with the first storage media of CMR zone 152, the second storage media of zones 154 and 156 can include additional SMR zones located on other disk surfaces of disk pack 150. The second storage media may also include one or more CMR zones and/or SSM zone 162 of solid-state memory 128. In addition, and as discussed in more detail below, zone 156 may be a zone designated as a spare zone in the second storage media for temporarily storing data.

As noted above, SMR can provide a way of increasing the amount of data that can be stored in a given area on a disk by increasing the number of Tracks Per Inch (TPI). SMR increases TPI by using a relatively wide shingle write head to overlap tracks like roof shingles. The non-overlapping portion then serves as a narrow track that can be read by a narrower read head.

Although a higher number of TPI is ordinarily possible with SMR, the overlap in tracks can create a problem when writing data since new writes to a previously overlapped track affects data written in the overlapping track. For this reason, SMR tracks are generally sequentially written to avoid affecting previously written data.

Managing sequentially written data for SMR storage media typically involves using address indirection to translate between different addressing schemes to ensure that data is sequentially written. When data is modified for a particular LBA, address indirection allows the DSD to sequentially write the modified data to a new location and remap the LBA for the data to the new location. The old version of the data at the previous location becomes obsolete or invalid data.

In some implementations, CMR zones may also use address indirection. One such example can involve using address indirection to manage data stored in a media cache where physical addresses for certain data may be redirected to a location in the media cache storing a copy of the data.

In the first storage media, zone 152 can provide a fixed physical location for storing data used during a startup process of host 101 (e.g., a fixed physical location corresponding to LBA 0 for an MBR). As discussed in more detail below, controller 120 identifies the first storage media to host 101 without identifying the second storage media before host 101 loads and executes DSD driver 12. By only identifying the first storage media during the startup process, it is ordinarily possible to avoid access of the second storage media during the startup process which may not be compatible with providing a fixed location for a particular LBA. This can also help prevent the straddling or spreading of files used during the startup process across the first and second storage media. After DSD driver 12 has loaded and is running, the second storage media can be made available to host 101 since DSD driver 12 can manage the access of the second storage media.

In addition, since the non-overlapping tracks of CMR zone 152 do not require sequential writing, CMR zone 152 can be used as a staging area for temporarily storing data such as temporary files or page files used by OS 14. In other implementations, SSM zone 160 can be used as a staging area for such temporary files.

As discussed in more detail below with reference to FIG. 6, the first storage media may be used in one example as a staging area for performing transactional writes that record data representing a series of events before completing or committing the transaction to the second storage media. After completing or committing the transaction, the data for the transaction can be copied from the first storage media to the second storage media. If the transaction is not completed or committed, the data for the transaction can be discarded or marked invalid so that the physical location storing the invalid data can be overwritten. By using the first storage media as a staging area for temporary and/or transactional writes, it is ordinarily possible to avoid performing unnecessary rewrites in the second storage media. In the case where the second storage media includes SMR zones, such unnecessary rewrites could involve rewriting an entire SMR zone to maintain sequential writing in the zone.

Although the implementations discussed above refer to CMR zone 152 and/or SSM zone 160 as being part of the first storage media and SMR zones 154 and 156 and/or SSM zone 162 as being part of the second storage media, other implementations can use different types of storage media for the first and second storage media. For example, the second storage media may include a different storage media type such as magnetic tape that is sequentially written and uses address indirection.

In the embodiment of FIG. 2, DSD 106 also includes volatile memory 140. In other embodiments, DSD 106 may use an NVM such as MRAM in place of volatile memory 140. In FIG. 2, volatile memory 140 can include, for example, a Dynamic Random Access Memory (DRAM) which can be used by DSD 106 to temporarily store data. Data stored in volatile memory 140 can include data read from NVMs (which may include disk pack 150 and solid-state memory 128), data to be written to NVMs, instructions loaded from DSD firmware 28 for execution by controller 120, and/or data used in executing DSD firmware 28. In this regard, DSD firmware 28 can be executed by controller 120 to control operation of DSD 106.

In the example of FIG. 2, volatile memory 140 is shown as storing write pointers 30 and zone mapping 32. Write pointers 30 can be used by controller 120 to keep track of a location for performing a next write in a sequentially written zone such as SMR zones 154 and 156. Write pointers 30 may also be stored in a NVM of DSD 106 such as disk pack 150 or solid-state memory 128 so that write pointers 30 are available after DSD 106 has been powered off. With reference to the embodiment of FIG. 1, CPU 108 of host 101 may also maintain or keep track of a portion of, or all of, write pointers 30 as write pointers 16 stored in memory 110 of host 101. In yet other embodiments, either of write pointers 16 stored in host 101 or write pointers 30 stored in DSD 106 can be eliminated.

Zone mapping 32 is used by controller 120 to associate zones of DSD 106 (e.g., CMR zone 152, SMR zones 154 and 156, and SSM zones 160 and 162 with logical addresses for data stored in the zones. In one implementation, zone mapping 32 can include ranges of LBAs for data stored in particular zones of DSD 106 so as to establish zone boundaries. Zone mapping 32 may also be stored in a NVM of DSD 106 such as disk pack 150 or solid-state memory 128 so that zone mapping 32 is available after DSD 106 has been powered off. With reference to the embodiment of FIG. 1, CPU 108 of host 101 may also maintain or keep track of a portion of, or all of, zone mapping 32 as zone mapping 18 stored in memory 110 of host 101. In yet other embodiments, either of zone mapping 18 stored in host 101 or zone mapping 32 stored in DSD 106 can be eliminated.

In operation, host interface 126 receives read and write commands from host 101 via host interface 126 for reading data from and writing data to NVMs such as disk pack 150 and solid-state memory 128. In response to a write command, controller 120 may buffer the data to be written in volatile memory 140.

For data to be written to disk pack 150, a read/write channel (not shown) of controller 120 may then encode the buffered data into write signal 36 which is provided to a head of HSA 136 for magnetically writing data to a disk surface of disk pack 150.

In response to a read command for data stored on a disk surface of disk pack 150, controller 120 controls a head of HSA 136 to magnetically read data stored on the surface of disk pack 150 and to send the read data as read signal 36. A read/write channel of controller 120 can then decode and buffer the data into volatile memory 140 for transmission to a host 101 via host interface 126.

For data to be stored in solid-state memory 128, controller 120 receives data from host interface 126 and may buffer the data in volatile memory 140. In one implementation, the data is then encoded into charge values for charging cells 161 or 163 of solid-state memory 128 to store the data.

In response to a read command for data stored in solid-state memory 128, controller 120 in one implementation reads current values for cells 161 or 163 in solid-state memory 128 and decodes the current values into data that can be transferred or copied to host 101. Such data may be buffered by controller 120 before transferring or copying the data to host 101 via host interface 126.

Storage Media Identification Examples

Figure 3A:
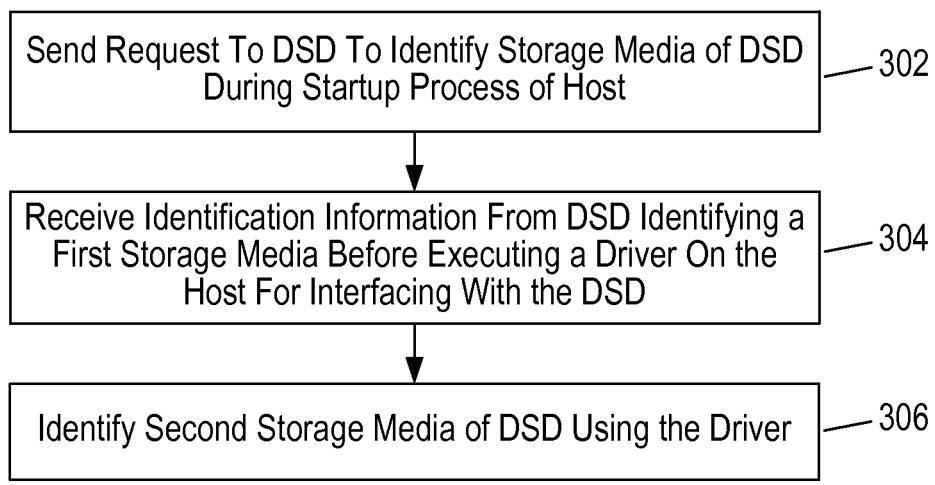
FIG. 3A is a flowchart for a storage media identification process according to an embodiment.

FIG. 3A is a flowchart for a storage media identification process that can be performed by CPU 108 of host 101 according to an embodiment. In block 302, CPU 108 sends a request to DSD 106 via DSD interface 119 during a startup process of host 101 to identify storage media of DSD 106. In block 304, CPU 108 receives identification information from DSD 106 via DSD interface 119. The identification information identifies a first storage media of DSD 106 (e.g., CMR zone 152 and/or SSM zone 160).

After loading and executing DSD driver 12, CPU 108 in block 306 uses DSD driver 12 to identify the second storage media of DSD 106 (e.g., SMR zones 154 and 156 and/or SSM zone 162). As discussed in more detail below with reference to the example sequence of FIG. 4A, CPU 108 may use DSD driver 12 to identify the second storage media based on the identification information received in block 304 or may send an additional request to DSD 106 to identify the second storage media of DSD 106.

Figure 3B:
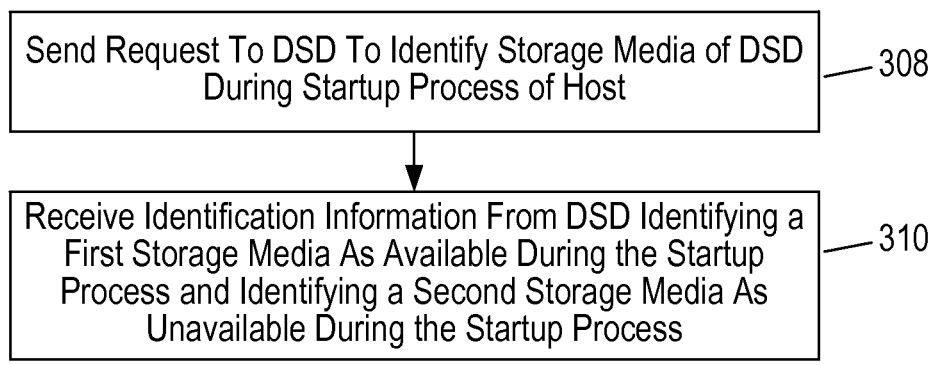
FIG. 3B is a flowchart for a storage media identification process according to another embodiment.

FIG. 3B is a flowchart for a storage media identification process that can be performed by CPU 108 of host 101 according to another embodiment. In block 308, CPU 108 sends a request to DSD 106 via DSD interface 119 during a startup process of host 101 to identify storage media of DSD 106. In block 310, CPU 108 receives identification information from DSD 106 via DSD interface 119.

Unlike the identification process of FIG. 3A, the identification information received in block 310 of FIG. 3B identifies the first storage media (e.g., CMR zone 152 and/or SSM zone 160) as available during the startup process and identifies the second storage media (e.g., SMR zones 154 and 156 and/or SSM zone 162) as unavailable during the startup process. As discussed in more detail below with reference to FIG. 4B, in an implementation where host interface 126 uses a SCSI interface standard, the identification information can identify the first storage media as Logical Unit Number (LUN) 0 and can identify the second storage media as LUN 1. In accordance with SCSI, a device identified as LUN 0 is used to report to the host the existence of other LUNs such as LUN 1, and stores all of the data used by the host during the startup process. As a result, host 101 will only access the first storage media identified as LUN 0 during the startup process and will not access the second storage media identified as LUN 1. Other implementations may use a different standard or way of identifying the first storage media as available during the startup process and identifying the second storage media as unavailable during the startup process. In this regard, unavailable can mean that while host 101 is aware of the existence of additional storage media, host 101 must take an additional action, such as executing driver 12, before accessing the second storage media.

Figure 4A:
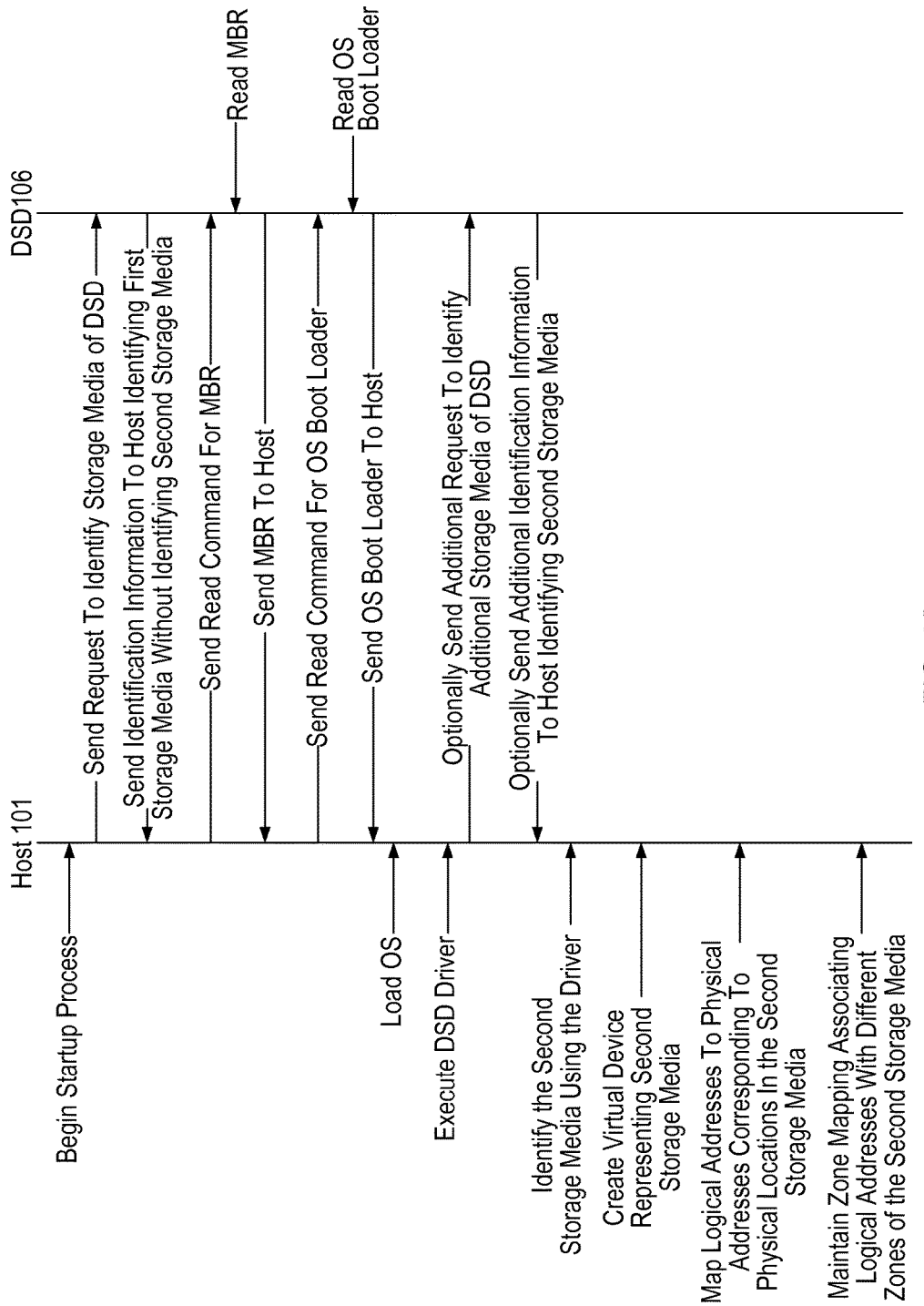
FIG. 4A is sequence diagram for a storage media identification process according to an embodiment.

FIG. 4A is a sequence diagram for an example storage media identification process in keeping with the embodiment of FIG. 3A. As shown in FIG. 4A, host 101 begins by performing a startup process which may take place after powering on host 101 or restarting host 101. In one implementation, host 101 may first load a Basic Input/Output System (BIOS) stored in ROM 118 or another NVM of host 101 (e.g., flash memory) which directs CPU 108 to check for storage devices via DSD interface 119. CPU 108 sends a request to DSD 106 to identify storage media of DSD 106.

In response, controller 120 of DSD 106 executing DSD firmware 28 sends identification information to host 101 identifying a first storage media (e.g., CMR zone 152 and/or SSM zone 160) without identifying a second storage media (e.g., SMR zones 154 and 156 and/or SSM zone 162). The identification information may include, for example, a capacity of the first storage media in terms of an LBA range for the first storage media or a data capacity of the first storage media.

The BIOS then causes CPU 108 to send a read command for a particular logical address (e.g., a boot sector at LBA 0) via DSD interface 119 to access an MBR. Controller 120 retrieves the MBR from the first storage media (e.g., CMR zone 152 or SSM zone 160) and sends the MBR to host 101 via host interface 126. CPU 108 then executes a bootstrap loader of the MBR which causes CPU 108 to send a read command via DSD interface 119 to access an OS boot loader for loading OS 14. A particular logical address for the OS boot loader is provided by a partition table included within the MBR. As with the logical address used to retrieve the MBR, the logical address for the OS boot loader is typically fixed. In an embodiment where address indirection for the second storage media is performed by DSD driver 12 operating on host 101 and not by controller 120 of DSD 106, host 101 may not be able to otherwise successfully load OS 14 if either the MBR or the OS boot loader were remapped in the second storage media. The example of FIG. 4A therefore waits until after CPU 108 loads and executes DSD driver 12 before identifying the second storage media to host 101.

DSD 106 receives the read command for the OS boot loader via host interface 126 and accesses the OS boot loader from the first storage media (e.g., CMR zone 152 or SSM zone 160) and sends the OS boot loader to host 101 via host interface 126. CPU 108 then receives the OS boot loader via DSD interface 119 and loads OS 14 by executing the OS boot loader. As OS 14 loads various applications of host 101, the existence of the second storage media is kept hidden from host 101 until CPU 108 executes DSD driver 12. During this startup process, OS 14 may generate a number of temporary files or page files used for temporarily storing data after loading. By keeping the second storage media hidden or unused before CPU 108 executes DSD driver 12, it is ordinarily possible to keep these temporary writes in the first storage media (e.g., CMR zone 152 and/or SSM zone 160) to avoid having to rewrite portions of the second storage media that may not support a write-in-place file system.

After CPU 108 begins running DSD driver 12, the second storage media of DSD 106 is identified using DSD driver 12. DSD driver 12 may identify the second storage media based on the identification information already received from DSD 106 or by sending an additional request to DSD 106 to identify additional storage media of DSD 106. In one implementation, the identification information initially received from DSD 106 may include additional information such as a model number for DSD 106 or reserved pages in the identification information that can be used by DSD driver 12 to identify the second storage media.

If CPU 108 sends an additional request via DSD interface 119, CPU 108 may use a Vendor Specific Command (VSC) or log pages to identify the second storage media. DSD 106 receives the additional request and reports back to host 101 with additional identification information to identify the second storage media. The additional identification information may include, for example, an LBA range for the second storage media or a capacity of the second storage media. The additional identification information may also include the LBA ranges or capacities for zones in the second storage media.

CPU 108 identifies the second storage media using DSD driver 12 with the additional identification information or with the initial identification information. In some implementations, DSD driver 12 may also learn of the number and capacity of zones in the second storage media using the initial identification information or the additional identification information. In such implementations, DSD driver may create zone mapping 18 which can be used to perform address indirection for the second storage media.

In some implementations, CPU 108 may request information from DSD 106 after identifying the second storage media. Such information may include, for example, some or all of write pointers 30 and zone mapping 32. CPU 108 may then use the information received from DSD 106 in creating write pointers 16 and/or zone mapping 18 stored in memory 110 of host 101.

Figure 5:
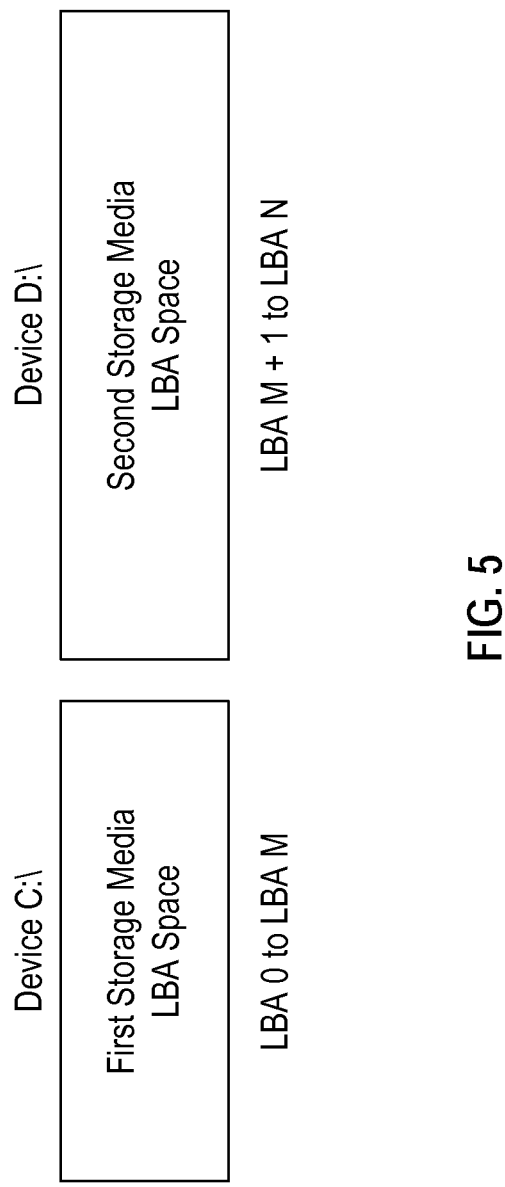
FIG. 5 is a diagram depicting the representation of a first storage media and a second storage media as separate virtual storage devices according to an embodiment.

As shown in the example of FIG. 5, DSD 106 can advertise in the initial identification information sent to host 101 a capacity for the first storage media of M+1 blocks for LBAs 0 to M. In addition to limiting the straddling of OS install files as discussed above, only advertising the capacity of the first storage media can further improve compatibility with OS 14 since the capacity for the first storage media remains relatively the same across multiple startups of OS 14. In this regard, the advertised capacity of the second storage media may vary across OS startups in the case where the second storage media includes SMR zones.

The second storage media is then initialized and presented to host 101 so that an LBA space for the second storage media including LBAs M+1 to N can be accessed by host 101 via DSD driver 12. The LBA space for DSD 106 may then include contiguous LBAs from 0 to a "true max" (e.g., LBA N in FIG. 5) and DSD driver 12 may manage an offset as appropriate.

The LBA space for the second storage media (which in some implementations can be most of the capacity of the DSD) is made visible to OS 14 as a separate "virtual" device after DSD driver 12 identifies the second storage media. This virtual device can be created by a driver of OS 14. As shown in FIG. 5, the LBA space of the first storage media can be set as device C:\ (or another volume name conventionally assigned to a default first volume for OS 14 such as /dev/sda in Linux) and the LBA space for the second storage media can be set as device D:\ (or another volume name such as /dev/sdb in Linux).

In one example, the LBA space for the first storage media corresponds to approximately 30 GB of total capacity with 5 GB for OS install files (e.g., OS boot loader and kernel files) and the remaining 25 GB allocated for staging and logging functions. In other examples, the capacity of the first storage media will differ. As described in more detail below with reference to FIG. 6, the LBA space for the first storage media may include a buffer or a reserved area for temporary or transactional writes and overwrites.

With reference back to the sequence diagram of FIG. 4A, after creating a virtual device representing the second storage media, CPU 108 controls access to the second storage media via DSD driver 12. In addition, CPU 108 uses DSD driver 12 to map logical addresses (e.g., LBAs) to physical addresses corresponding to physical locations for storing the data in the second storage media. The mapping can be performed using zone mapping 18 stored in memory 110 and CPU 108 can maintain zone mapping 18 using DSD driver 12.

Figure 4B:
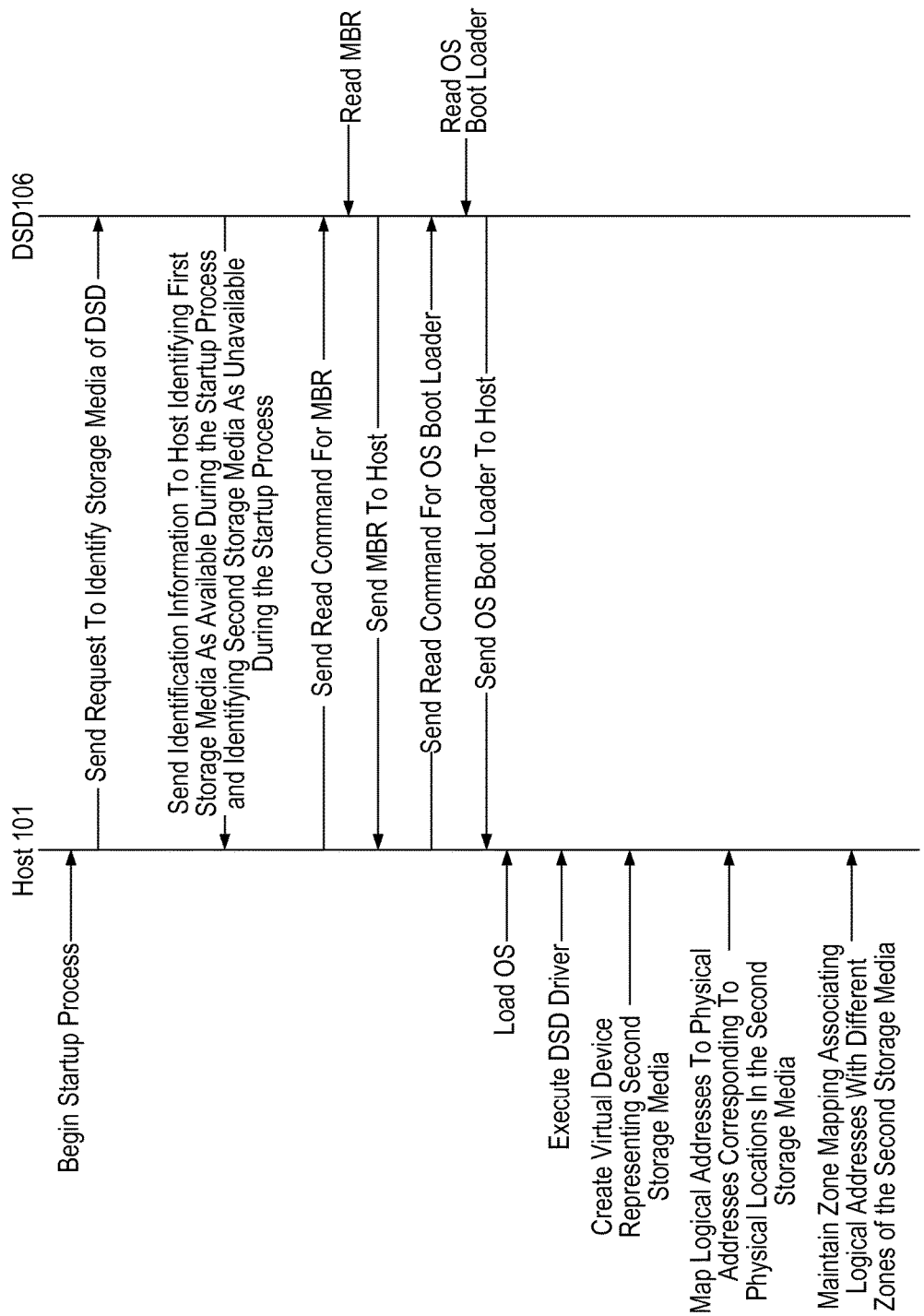
FIG. 4B is a sequence diagram for a storage media identification process according to an embodiment.

FIG. 4B is a sequence diagram for a storage media identification process in keeping with the embodiment of FIG. 3B discussed above. The sequence of FIG. 4B differs from that of FIG. 4A in that the identification information received from DSD 106 identifies the first storage media as available during the startup process and identifies the second storage media as unavailable during the startup process. In a SCSI implementation, this can be accomplished where the identification information identifies the first storage media as LUN 0 and identifies the second storage media as LUN 1. As noted above, unavailable can mean that while host 101 is aware of the existence of additional storage media, host 101 must take an additional action before accessing the second storage media.

Since the first and second storage media are identified during the startup process in the sequence of FIG. 4B, CPU 108 does not need to send an additional request to DSD 106 to identify additional storage media after executing DSD driver 12. However, and as discussed above with reference to FIG. 4A, CPU 108 may request additional information from DSD concerning the second storage media such as, for example, some or all of write pointers 30 or zone mapping 32.

The other aspects of the sequence of FIG. 4B are substantially similar to those of FIG. 4A described above. A further understanding of these aspects can be obtained with reference to the description of FIG. 4A provided above.

As discussed above, DSD driver 12 allows CPU 108 to perform address indirection to remap logical addresses for data to new physical addresses in the second storage media. This arrangement allows for the use of the typically greater resources of host 101 (e.g., CPU 108 and memory 110) to perform address indirection instead of performing address indirection using the typically more limited resources of DSD 106 (e.g., controller 120 and volatile memory 140). In the case where the second storage media includes a large capacity, performing address indirection for the second storage media can consume a large amount of resources on DSD 106.

In some embodiments, DSD 106 may also perform some management tasks such as performing address indirection or maintaining write pointers 30. In such embodiments, host 101 can access write pointers 30 and/or zone mapping 32 to allow DSD driver 12 to enhance the performance of system 100 by using information not usually available at DSD 106 or by sharing in some of the processing needed for managing DSD 106.

In one example, DSD driver 12 may perform a "quick delete" or "delayed delete" in the second storage media by manipulating data structures stored in memory 110 without having to modify the deleted data in the second storage media.

In the case where the second storage media includes sequentially written zones, DSD driver 12 may also allow for host side management of write pointers for sequentially written zones in the second storage media. The write pointers can indicate a location for a next write in a sequentially written zone such as an SMR zone. DSD driver 12 may store these write pointers as write pointers 16 in memory 110.

By shifting the management of the second storage media to the greater resources of host 101, system 100 can improve an overall system performance. Performance penalties associated with managing the second storage media can be postponed using the greater resources of host 101 to reduce a performance penalty of the overall system. In addition, shifting management of the second storage media to host 101 may also allow for more efficient use of the second storage media by using host information that is usually unavailable to DSD 106.

In one implementation, DSD driver 12 can be "host behavior aware" and may schedule maintenance operations for the second storage media based upon a host behavior such as when AC power is available for system 100 or when host activity is relatively low. Such host coordinated scheduling of maintenance operations can ordinarily improve an overall performance of the system. One such maintenance operation can include garbage collection where data is read and rewritten to reclaim portions of the media storing invalid or obsolete data. In the case of an SMR zone that is sequentially written, large portions or all of the SMR zone may need to be read and then rewritten without the invalid data to perform garbage collection. DSD driver 12 may designate a zone of the second storage media (e.g., SMR zone 156 in FIG. 2) as a spare zone for temporarily storing valid data from a garbage collected zone. The designated zone in the second storage media may also facilitate other read-write-modify operations in the second storage media. In other implementations, buffer 26 in memory 110 of host 101 can be used for read-modify-write operations such as those used for garbage collection.

DSD driver 12 may also use information available on the host side to tune garbage collection policies based upon an amount of invalid data in a particular zone and/or a frequency of access (i.e., hotness) of data in a particular zone. In one example, DSD driver 12 may monitor the access of different zones in the second storage media by applications running on host 101 to determine a frequency of access for a particular zone and prioritize a more frequently accessed zone for garbage collection.

DSD driver 12 may also mask errors reported from DSD 106 by adding a layer for error recovery before reporting the error to OS 14. For example, DSD driver 12 may use information from host 101 to determine when to retry a failed operation before reporting an error.

In addition, file level management using DSD driver 12 can take advantage of LBA boundaries known on the host side via file system 24 and zone mapping 32 to better migrate files among zones in the second storage media. In this regard, SMR often relies on read-modify-write operations to migrate data into SMR zones since writing new data into an SMR zone can affect previously written data. The management of such migration of data into SMR zones can be handled by DSD driver 12 to take account of file level LBA boundaries to reduce file fragmentation. In addition, DSD driver 12 may make use of buffer 26 in memory 110 of host 101 in cases where a read-modify-write operation is needed.

DSD driver 12 may also facilitate sequential and simultaneous writing to multiple zones in the second storage media to support multiple host write streams since DSD driver 12 is capable of identifying separate host write streams on the host side. In one example, CPU 108 using DSD driver 12 can assign logical addresses for data of a plurality of host write streams so that the data for each of the host write streams is assigned to different zones of the second storage media on different disk surfaces of disk pack 150 at the same radial location. CPU 108 can then send at least one write command to DSD 106 to simultaneously write the plurality of host write streams to different disk surfaces of disk pack 150 since the data for the write streams has been assigned to the same radial location.

In addition, DSD driver 12 can enable file system write command queuing and sequentially reorder the write commands in terms of logical address before commanding DSD 106 to perform the write commands. In one implementation, DSD driver 12 reorders the performance of pending write commands in command queue 20 for the second storage media so that the data to be written in performing the pending write commands follows an increasing or decreasing order of logical addresses to be written.

DSD driver 12 can also detect impending temporary writes and overwrites using information available on the host side. In one implementation, a module of DSD driver 12 can detect data for a temporary write, overwrite, or transaction based on attributes of a file such as a file name (e.g., a format for temporary file names in a particular OS) or a directory location (e.g., placement in a temp directory). The file name or directory location may indicate, for example, that the data is part of a page file or hibernation file that is temporary. In other implementations, DSD driver 12 may use a hinting provided by an application running on host 101 as to a priority of data that is associated with temporary data.

DSD driver 12 may also learn that certain data is likely to be overwritten based on past host activity.

After identifying a temporary write command for temporarily storing data, DSD driver 12 can map at least one logical address to at least one physical address in the first storage media and send the temporary write command to DSD 106 to store the data in the first storage media. In this way, unnecessary rewrites in the second storage media can be reduced by using a portion of the first storage media as a scratch space or buffer where rewriting data is less costly in terms of system resources.

Transactional Write Example

Figure 6:
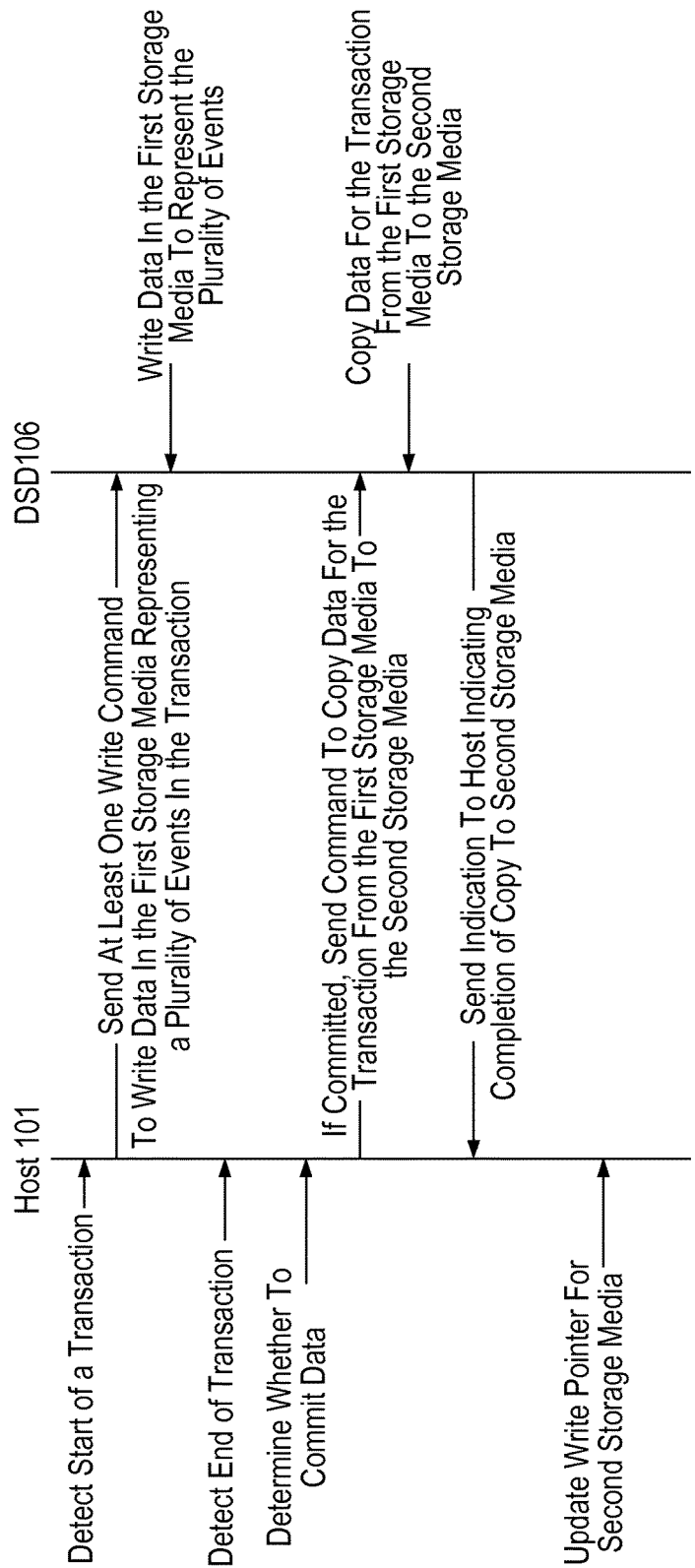
FIG. 6 is a sequence diagram for recording a transaction according to an embodiment.

FIG. 6 is a sequence diagram for recording a transaction according to an embodiment. The sequence of FIG. 6 begins with CPU 108 using DSD driver 12 to detect the start of a transaction. As discussed above, this may be accomplished by executing a module of DSD driver 12 that provides for temporary, overwrite, and transactional write detection. The detection of a transaction may come from a notification from an application executing on host 101 such as application 22 or from file system 24. In other examples, the module may detect writes for certain types of files such as temporary files or page files based on information from file system 24 or file attributes such as a file name or location of a file in a particular directory. The module may also detect a transaction with the accessing of a particular type of file such as, for example, a database file or a word processing file.

After the start of the transaction, the writes for the transaction are staged or performed in the first storage media (e.g., CMR zone 152 and/or SSM zone 160). In some implementations, the writes for the transaction may be staged in a reserved portion of the first storage media designated as a scratch space for recording transactions before committing the transaction to the second storage media. Writing data in the first storage media where write-in-place is allowed can better facilitate frequent changes to the data during the transaction. If write-in-place is not allowed in the second storage media, the frequent changes consume more storage space in the second storage media and create more invalid data. The sequence of FIG. 6 allows the changes to accumulate during the transaction in the first storage media before writing the data for the transaction in the second storage media. In some scenarios, the changes may ultimately result in a range of LBAs being invalidated and eliminate the need to write the data in the second storage media.

As discussed above, new writes to a previously overlapped track in an SMR zone affects data written in an overlapping track. Changes to data in a sequentially written SMR zone usually involve remapping an LBA for the data to a new location and leaving invalid data in the previous location. Numerous changes to data in an SMR zone can lead to having to garbage collect the SMR zone sooner, which can reduce a performance of the DSD. In contrast, numerous changes to data in a non-SMR zone (e.g., CMR zone 152) generally results in less of a performance penalty.

As shown in FIG. 6, CPU 108 sends at least one write command via DSD interface 119 to write data in the first storage media representing a plurality of events of the transaction. For its part, DSD 106 writes the data for the transaction in the first storage media.

When DSD driver 12 detects that the transaction has ended, such as by the detection of the closing of a particular application, DSD driver 12 determines whether to commit the data written in the first storage media to the second storage media. The determination of whether to commit the data for the transaction can be based on an indication from an application that the transaction is to be committed or saved. If the data for the transaction is not to be committed, the data is discarded or invalidated in the first storage media so that the portion first storage media storing the data for the transaction can be reused.

If the data for the transaction is to be committed, DSD driver 12 sends a command to DSD 106 to flush or copy the data for the transaction from the first storage media to the second storage media. In some implementations, the data in the first storage media for the transaction may then be discarded or invalidated after being copied to the second storage media.

After copying the data for the transaction, controller 120 sends an indication to host 101 indicating completion of copying the data to the second storage media. In the case where the data has been copied to an SMR zone of the second storage media, DSD driver 12 updates a write pointer in write pointers 16 for the SMR zone.

In addition to the benefits discussed above of staging transactional writes in the first storage media, such staging can also help in recovering from an unexpected error or power loss during the transaction. In this regard, DSD driver 12 may look to a write pointer in write pointers 16 to determine whether a transaction was committed to the second storage media before an unexpected error or power loss. If the write pointer has not been updated, DSD driver 12 may access the first storage media to recover the data from the interrupted transaction so that the transaction can be completed. On the other hand, if the write pointer has been updated for the zone in the second storage media, DSD driver 12 will determine that the transaction was already committed and that no recovery is needed for the transaction.

In other embodiments, DSD driver 12 may make use of memory 110 of host 101 as a staging area for storing data for a transaction that has not yet been committed. Such an embodiment could follow the sequence of FIG. 6 except that data representing the transaction would be stored in memory 110 instead of the first storage media.

In yet another embodiment, DSD driver 12 may use a write pointer of write pointers 16 to stage the writes for a transaction in the second storage media before committing the transaction by updating the write pointer. In more detail, CPU 108 using DSD driver 12 can send at least one write command to DSD 106 to write data in an SMR zone 154 of the second storage media to represent a plurality of events of the transaction without updating the write pointer for SMR zone 154. If the data for the transaction is to be committed, DSD driver 12 updates the write pointer to indicate the completion of the transaction. On the other hand, if the data for the transaction is not to be committed, DSD driver 12 does not update the write pointer so that the data for the transaction is overwritten when data is sequentially written to SMR zone 154 starting from the non-updated location of the write pointer.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A host, comprising:
an interface for communicating with a Data Storage Device (DSD);
a memory for storing a driver for interfacing with the DSD; and
a processor configured to:
send a request via the interface to the DSD for identifying storage media of the DSD that is available for access during a startup process of the host;
receive identification information from the DSD via the interface before executing the driver, the identification information identifying a first storage media of a plurality of storage media of the DSD in response to the request; and
subsequently identify a second storage media of the plurality of storage media of the DSD using the driver.

2. The host of claim 1, wherein the processor is further configured to use the first storage media to store data used during the startup process before executing the driver.

3. The host of claim 1, wherein the processor is further configured to use the driver to map logical addresses for data to physical addresses corresponding to physical locations for storing the data in the second storage media.

4. The host of claim 3, wherein the processor is further configured to perform address indirection in mapping the logical addresses to the physical addresses to allow for remapping of the logical addresses to new physical addresses in the second storage media.

5. The host of claim 1, wherein the processor is further configured to use an Operating System (OS) of the host to represent the first storage media as a first virtual storage device and represent the second storage media as a second virtual storage device separate from the first virtual storage device.

6. The host of claim 1, wherein in identifying the second storage media of the DSD using the driver, the processor is further configured to identify the second storage media based on the identification information received from the DSD.

7. The host of claim 1, wherein in identifying the second storage media of the DSD using the driver, the processor is further configured to:
send an additional request to the DSD via the interface to identify additional storage media of the DSD;
receive additional identification information from the DSD; and
identify the second storage media using the additional identification information.

8. The host of claim 1, wherein the processor is further configured to use the driver to maintain a zone mapping associating logical addresses for data with different zones of the second storage media.

9. The host of claim 1, wherein the processor is further configured to use the driver to designate a spare zone in the second storage media for temporarily storing data.

10. The host of claim 1, wherein the processor is further configured to use the memory for temporarily storing data read from the DSD as part of a read-modify-write operation in the second storage media.

11. The host of claim 1, wherein the second storage media includes a plurality of zones of overlapping tracks on at least one rotating magnetic disk, and wherein the processor is further configured to use the driver to:
assign logical addresses for data for a plurality of host write streams so that the data for each of the host write streams is assigned to different zones of the second storage media on different disk surfaces of the at least one rotating magnetic disk at the same radial location; and
send at least one write command to the DSD to simultaneously write the plurality of host write streams on the different disk surfaces of the at least one rotating magnetic disk.

12. The host of claim 1, wherein the processor is further configured to use the driver to reorder the performance of pending write commands for the second storage media such that the data to be written in performing the pending write commands follows an increasing or decreasing order of logical addresses for the data to be written.

13. The host of claim 1, wherein the processor is further configured to use the driver to identify a zone for garbage collection from a plurality of zones of the second storage media based on a frequency of access of data in the zone.

14. The host of claim 1, wherein the processor is further configured to use the driver to:
identify a temporary write command for temporarily storing data in the DSD;
map at least one logical address for the data from the temporary write command to at least one physical address corresponding to a physical location in the first storage media; and
send the temporary write command to the DSD for storing the data from the temporary write command in the first storage media.

15. The host of claim 1, wherein the processor is further configured to use the driver to:
detect a start of a transaction including a plurality of events from an application executing on the host;
send at least one write command to the DSD to write data in the first storage media representing the plurality of events of the transaction;
detect a completion of the transaction from the application executing on the host;
send a command to the DSD to copy data for the transaction from the first storage media to the second storage media after detecting the completion of the transaction;
receive an indication from the DSD indicating completion of the copying of the data for the transaction to the second storage media; and
update a write pointer for the second storage media after receiving the indication from the DSD.

16. The host of claim 1, wherein the processor is further configured to use the driver to:
detect a start of a transaction including a plurality of events from an application executing on the host;
store data in the memory representing the plurality of events of the transaction;
detect a completion of the transaction from the application executing on the host;
send a command to the DSD to copy data for the transaction from the memory to the second storage media after detecting the completion of the transaction;
receive an indication from the DSD indicating completion of the copying of the data for the transaction to the second storage media; and
update a write pointer for the second storage media after receiving the indication from the DSD.

17. The host of claim 1, wherein data is sequentially written in the second storage media, and wherein the processor is further configured to use the driver to:
detect a start of a transaction including a plurality of events from an application executing on the host;
send at least one write command to the DSD to write data in the second storage media representing the plurality of events of the transaction without updating a write pointer used to indicate a location for writing data in the second storage media;
detect a completion of the transaction from the application executing on the host; and
update the write pointer to indicate the completion of the transaction.

18. A method of interfacing with a Data Storage Device (DSD), the method comprising:
sending a request to the DSD for identifying storage media of the DSD that is available for access during a startup process of a host;
receiving identification information from the DSD before executing a driver on the host for interfacing with the DSD, the identification information identifying a first storage media of a plurality of storage media of the DSD in response to the request; and
subsequently identifying a second storage media of the plurality of storage media of the DSD using the driver.

19. The method of claim 18, further comprising using the first storage media to store data used during the startup process before executing the driver.

20. The method of claim 18, further comprising using the driver to map logical addresses for data to physical addresses corresponding to physical locations for storing the data in the second storage media.

21. The method of claim 20, wherein address indirection is performed in mapping the logical addresses to the physical addresses to allow for remapping of the logical addresses to new physical addresses in the second storage media.

22. The method of claim 18, further comprising using an Operating System (OS) of the host to represent the first storage media as a first virtual storage device and represent the second storage media as a second virtual storage device separate from the first virtual storage device.

23. The method of claim 18, wherein the second storage media of the DSD is identified based on the identification information received from the DSD.

24. The method of claim 18, wherein in identifying the second storage media of the DSD using the driver, the method further comprises:
sending an additional request to the DSD to identify additional storage media of the DSD;
receiving additional identification information from the DSD; and
identifying the second storage media using the additional identification information.

25. The method of claim 18, further comprising using the driver to maintain a zone mapping associating the logical addresses with different zones of the second storage media.

26. The method of claim 18, further comprising using the driver to designate spare zones in the second storage media for temporarily storing data.

27. The method of claim 18, further comprising using a memory of the host for temporarily storing data read from the DSD as part of a read-modify-write operation in the second storage media.

28. The method of claim 18, wherein the second storage media includes a plurality of zones of overlapping tracks on at least one rotating magnetic disk, and wherein the method further comprises:
using the driver to assign logical addresses for data for a plurality of host write streams so that the data for each of the host write streams is assigned to different zones of the second storage media on different disk surfaces of the at least one rotating magnetic disk at the same radial location; and
sending at least one write command to the DSD to simultaneously write the plurality of host write streams on the different disk surfaces of the at least one rotating magnetic disk.

29. The method of claim 18, further comprising using the driver to reorder the performance of pending write commands for the second storage media such that the data to be written in performing the pending write commands follows an increasing or decreasing order of logical addresses for the data to be written.

30. The method of claim 18, further comprising using the driver to identify a zone for garbage collection from a plurality of zones of the second storage media based on a frequency of access of data in the zone.

31. The method of claim 18, further comprising using the driver in:
identifying a temporary write command for temporarily storing data in the DSD;
mapping at least one logical address for the data from the temporary write command to at least one physical address corresponding to a physical location in the first storage media; and
sending the temporary write command to the DSD for storing the data from the temporary write command in the first storage media.

32. The method of claim 18, further comprising using the driver in:
detecting a start of a transaction including a plurality of events from an application executing on the host;
sending at least one write command to the DSD to write data in the first storage media representing the plurality of events of the transaction;
detecting a completion of the transaction from the application executing on the host;
sending a command to the DSD to copy data for the transaction from the first storage media to the second storage media after detecting the completion of the transaction;
receiving an indication from the DSD indicating completion of the copying of the data for the transaction to the second storage media; and
updating a write pointer for the second storage media after receiving the indication from the DSD.

33. The method of claim 18, further comprising using the driver in:
detecting a start of a transaction including a plurality of events from an application executing on the host;
storing data in a memory of the host representing the plurality of events of the transaction;
detecting a completion of the transaction from the application executing on the host;
sending a command to the DSD to copy data for the transaction from the memory to the second storage media after detecting the completion of the transaction;
receiving an indication from the DSD indicating completion of the copying of the data for the transaction to the second storage media; and
updating a write pointer for the second storage media after receiving the indication from the DSD.

34. The method of claim 18, wherein data is sequentially written in the second storage media, and wherein the method further comprises using the driver in:
detecting a start of a transaction including a plurality of events from an application executing on the host;
sending at least one write command to the DSD to write data in the second storage media representing the plurality of events of the transaction without updating a write pointer used to indicate a location for writing data in the second storage media;
detecting a completion of the transaction from the application executing on the host; and
updating the write pointer to indicate the completion of the transaction.

35. A Data Storage Device (DSD), comprising:
a first storage media for storing data;
a second storage media for storing data, wherein the second storage media is accessed using address indirection; and
a controller configured to:
receive a request from a host for identifying storage media of the DSD that is available for access during a startup process of the host; and
send identification information to the host in response to the request identifying the first storage media without identifying the second storage media.

36. The DSD of claim 35, wherein the first storage media stores data used during the startup process before the host executes a driver for interfacing with the DSD.

37. The DSD of claim 35, wherein the first storage media includes a solid-state memory or at least one zone of non-overlapping tracks on a rotating magnetic disk.

38. The DSD of claim 35, wherein the second storage media includes at least one zone of overlapping tracks on a rotating magnetic disk.

39. The DSD of claim 35, wherein the host executes a driver for interfacing with the DSD, and wherein the first storage media is used to store data identified by the driver for temporary storage.

40. The DSD of claim 35, wherein the host executes a driver for interfacing with the DSD, and wherein the first storage media is used as a staging area for storing data representing a plurality of events of a transaction before the driver detects a completion of the transaction.

41. A Data Storage Device (DSD), comprising:
a first storage media for storing data;
a second storage media for storing data, wherein the second storage media is accessed using address indirection; and
a controller configured to:
receive a request from a host for identifying storage media of the DSD that is available for access during a startup process of the host; and
send identification information to the host in response to the request identifying the first storage media as available during the startup process and identifying the second storage media as unavailable during the startup process.

42. A non-transitory computer readable medium storing computer executable instructions for interfacing with a Data Storage Device (DSD), wherein when the computer executable instructions are executed by a processor of a host, the computer executable instructions cause the processor to:
identify a second storage media of the DSD that was not previously identified during a startup process of the host, wherein a first storage media of the DSD was identified by the host as available for access during the startup process before executing the computer executable instructions for interfacing with the DSD.

* * * * *